Sept. 21, 1926.
J. E. NOONAN
1,600,697
METHOD AND APPARATUS FOR MANIPULATING PLASTIC MATERIAL
Filed Jan. 29, 1924
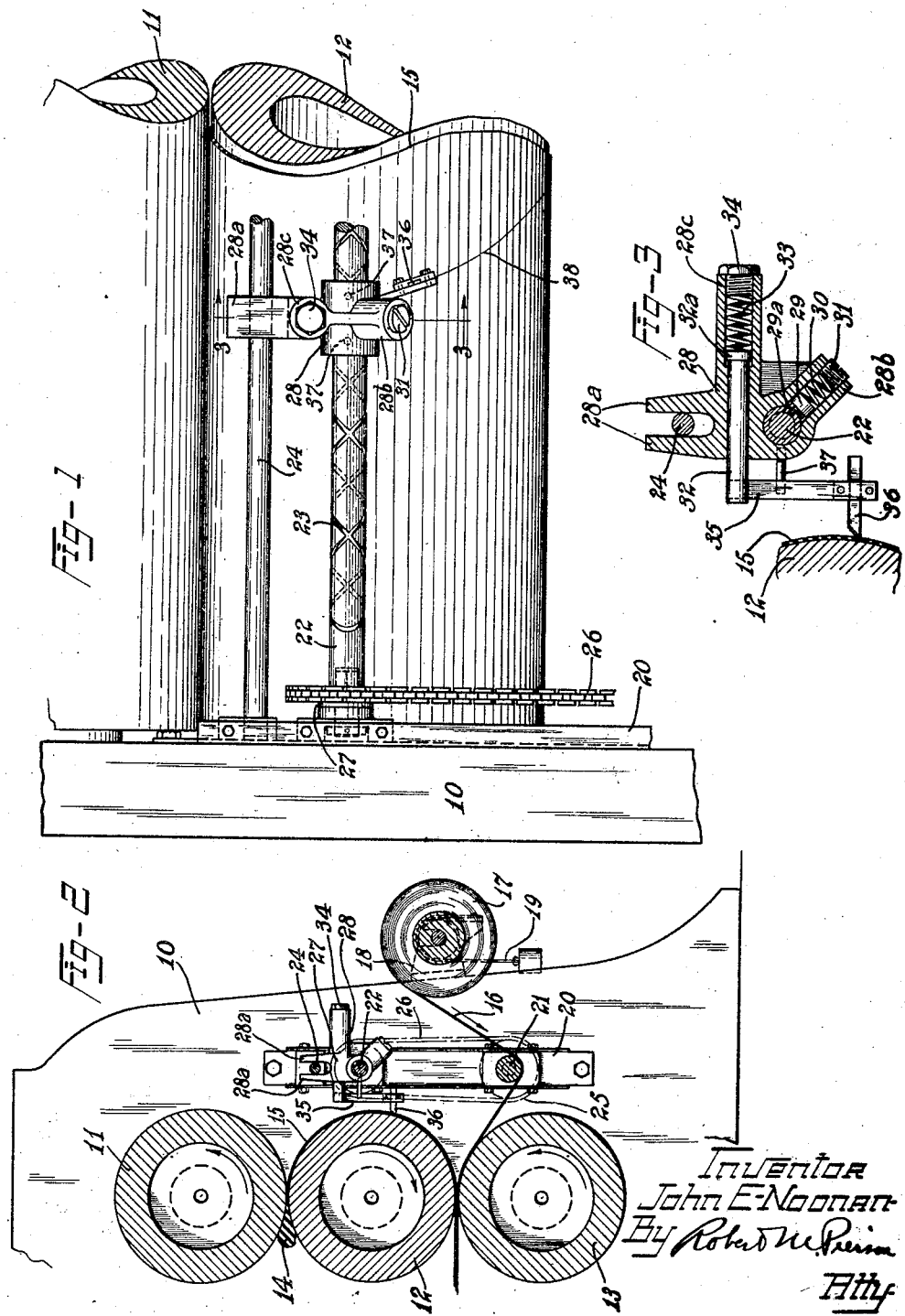
Inventor
John E. Noonan
By Robert M. Pierson
Atty Patented Sept. 21, 1926.

1,600,697

UNITED STATES PATENT OFFICE.

JOHN E. NOONAN, OF AKRON, OHIO, ASSIGNOR TO THE B. F. GOODRICH COMPANY, OF NEW YORK, N. Y., A CORPORATION OF NEW YORK.

METHOD AND APPARATUS FOR MANIPULATING PLASTIC MATERIAL.

Application filed January 29, 1924. Serial No. 689,334.

This invention relates to the art of manipulating plastic material, and more particularly to calendering plastic coating-material onto sheet material, as in the art of rubberizing fabric.

In the sheeting of unvulcanized rubber and applying it to fabric, a serious difficulty heretofore encountered is the entrapping of air or gases between the sheeted stock and the calender roll by which it is carried to the fabric, such entrapped air accumulating in small air bubbles or blisters. Unless relieved, the air in said blisters accumulates at the bight of the rolls until it attains such volume as to burst through the rubber sheet. This results in a blemish upon the coated material which not only is unsightly, but forms a defect because of the inferior adhesion of the rubber to the fabric at the point of rupture.

The chief object of my invention is to provide simple and efficient procedure and apparatus for preventing such accumulation of entrapped air. A further object is to permit the escape of such air without objectionably affecting the continuity of the sheeted stock. A further object is to provide improved procedure and apparatus for cutting a sinuous incision in sheet material.

Of the accompanying drawings:

Fig. 1 is a fragmentary front elevation of a calender and a sheet-cutting device mounted thereon, embodying a preferred form of my invention.

Fig. 2 is a vertical section through the same showing the sheet cutting device in elevation.

Fig. 3 is a section on line 3—3 of Fig. 1.

Referring to the drawings 10, 10 are the end frames of a rubber-working calender and 11, 12, and 13 are the calender rolls journaled therein. 14 is the usual bank of plastic, unvulcanized rubber and 15 is the sheeted stock, which passes partly around the roll 12 and is adhesively pressed by the latter onto a strip of backing material such as the strip of fabric 16, against the bottom roll 13. A supply roll 17 for the strip 16 is mounted in front of the calender in supporting brackets 18 secured to the respective frames 10 of the latter, said supply roll being provided with a suitable brake 19 to insure that the strip 16 will have proper tension.

Secured to the inner faces of the respective frames 10 are vertical, U-shaped, shaft-supporting brackets 20, 20, and journaled in suitable bearing members mounted in said brackets is a guide roller 21, under which the strip 16 passes in traveling from the supply roll 17 to the calender rolls, a rotatable shaft 22 above the guide roll 21, having its surface formed with a return-screw groove 23, and a stationary guide-bar 24 above the rotatable shaft 22. A sprocket 25 is secured on one end of the guide roller 21 and connected by a sprocket chain 26 with a sprocket 27 secured on the shaft 22, the shaft 22 thus being adapted to be driven when the guide roller 21 is rotated by the strip 16.

Mounted on the rotatable shaft 22 is a carriage 28 formed with a pair of upstanding fingers $28^a$, which straddle the guide-bar 24, thus maintaining said carriage in its normal upright position on said shaft. The carriage 28 is formed with an apertured boss $28^b$ disposed radially with relation to the axis of the shaft 22, and rotatably mounted in the aperture of said boss is a nut segment 29 formed with a short, single thread $29^a$ which is engaged in the return-screw groove 23 in the shaft 22, being yieldingly held in such engagement by a compression spring 30 interposed between the rear of the nut 29 and a plug 31 threaded into the outer end of the boss aperture, the carriage thus being adapted to be driven back and forth throughout the length of the grooved portion of the shaft 22.

The carriage 28 also is formed, on its side farthest from the calender, with a horizontally projecting, apertured boss $28^c$, above and at right angles to the shaft 22. The aperture in the boss $28^c$ extends, with reduced diameter, through the carriage, and a spindle 32 is rotatably mounted in said reduced portion with one of its ends projecting therefrom toward the calender, its other end extending into the relatively large boss aperture and being formed with a head $32^a$, and a compression spring 33 is interposed between said head and a plug 34 screwed into the outer end of the boss aperture, to urge said spindle toward the calender.

To the outer end of the spindle 32 is secured a depending bracket or knife-holder 35 having a thin, flat, preferably flexible, pointed knife blade 36 clamped in its lower end, the point of the knife 36 being held in yielding contact with the calender roll 12 by the spring 33. The shaft 22 is preferably so mounted with relation to the calender roll 12 that said knife 36 engages the latter at a point substantially below the horizontal plane of its axis, for a reason hereinafter explained. The swiveled support for the depending bracket 35 being adapted, as described, for oscillating movement of the knife 36 with relation to the carriage, a pair of stop pins 37, 37, projecting from the carriage 28 at each side of the bracket 35, are provided for limiting such movement.

In the operation of my device, the calender being driven, the bank of plastic rubber 14 is sheeted between the rolls 11, 12, the fabric sheet 16 is drawn into the calender, past the guide-roller 21, driving the latter between the calender rolls 12 and 13 as shown, said rolls applying the sheeted rubber 15 to the fabric. The shaft 22 being thus driven, through the sprockets 25, 27 and connecting sprocket-chain 26, from the guide-roll 21, the carriage 28 is propelled back and forth on the shaft 22, causing the knife 36 to follow a sinuous path with relation to the moving sheet of rubber 15 on the roll 12, and to cut in said sheet a continuous slit, as shown at 38, Fig. 1. Thus any bubbles, as they are formed by the accumulation of air or gases at the bight of the rolls 12, 13, will promptly be reached by a loop of the slit 38, through which they then escape, before accumulating in such large volume as to rupture the sheet.

The path of the knife with relation to the work is of course determined by the relative speed of travel of the sheet 15 and the knife. The swiveled mounting of the knife-bracket 35 permits the knife to align itself parallel with the direction of relative movement of the work, within the limits imposed by the stops 37, so that the incision will be clean-cut and the adjacent margins of the sheet will not be spread apart. An advantage in mounting the knife below the horizontal plane of the axis of the calender roll is that the longitudinal axis of the knife may be disposed at an angle to the face of the roll 12 such as to result in an oblique or beveled cut without departing from the simple, right-angled, vertical and horizontal disposition of various parts described, such beveled cut being adapted, after permitting the escape of air or gases, to close in a lapped, bevel seam, which is pressed and healed by the calender rolls.

Flexure of the knife, by its pressure against the work and against the roll, may also be utilized to produce a beveled cut, as by so positioning the stops 37 as to prevent the knife from perfectly aligning itself with the relative movement of the work. The force of the spring 33 also may be employed to produce flexure of the knife, said spring resisting the climbing of the knife under the force of the work thereagainst. While the specific form of apparatus herein described is adapted to produce a continuous, sinuous cut, the loops of which may be of an amplitude equal to the full width of the fabric strip, so that the pocketed gases are periodically vented throughout the full width of the fabric, a continuous incision is of course not indispensable, and in the appended claims the word incision is intended to include any form of through cut or perforation.

As the slit at all points progresses longitudinally of the sheet, gaping open of the slit, such as might occur if the cut were disposed parallel to the roll's axis, is avoided.

Various modifications may be resorted to within the scope of my invention, and I do not wholly limit my claims to the specific procedure or construction shown and described.

I claim:

1. The method of applying a sheet of plastic material to backing material which comprises progressively associating it therewith by rolling pressure, and venting gas from between said sheet and the means by which it is pressed by periodic incision of said sheet in advance of the rolling operation.

2. The method of manipulating plastic material which comprises sheeting it against a forming member, applying rolling pressure to the sheeted stock against said member, and venting gas from between the sheeted stock and said member by periodic incision of the sheeted stock in advance of the rolling operation.

3. The method of applying plastic material to a strip of backing material which comprises sheeting said plastic material against a forming member, rolling it therefrom onto said backing material, and venting gas from between said sheet and said forming member by periodic incision of the sheet in advance of the rolling operation.

4. The method of calendering plastic material onto backing material which comprises so rolling said plastic material into sheet form that the sheeted plastic material remains upon one of the sheet-rolling members, progressively applying said backing material to said sheeted plastic material by rolling pressure sustained by said sheet-rolling member having the sheeted plastic material thereon, and venting gas from between said sheet-rolling member and the sheeted plastic material by periodic incision of the latter in advance of the application of said rolling pressure.

5. The method of applying a coating of plastic material to backing material which comprises calendering the plastic material onto said backing material and venting gas from between the sheeted plastic material and the roll on which it is carried by periodic incision of the plastic sheet as it passes, upon said roll, to the backing material.

6. The method of rubberizing fabric which comprises calendering the rubber thereonto and venting gas from between the sheeted rubber and the roll on which it is carried by periodic incision of the rubber sheet as it passes, upon said roll, to the fabric.

7. The method of applying a coating of plastic material to a strip of backing material which comprises calendering said plastic material onto said backing material and venting gas from between the sheeted plastic material and the roll on which it is carried, by periodic incision of the plastic sheet as it passes, upon said roll, to the backing material, the incision being oblique with relation to the thickness of the sheet.

8. The method of applying a coating of plastic material to a strip of backing material which comprises calendering said plastic material onto said backing material and venting gas from between the sheeted plastic material and the roll on which it is carried, by periodic incision of the plastic sheet as it passes, upon said roll, to the backing material, the incision being of sinuous form, progressing lengthwise of the work, and its loops being of an amplitude substantially equal to the width of the strip of backing material.

9. The method of applying a coating of plastic material to a strip of backing material which comprises calendering said plastic material onto said backing material and venting gas from between the sheeted plastic material and the roll on which it is carried, by periodic incision of the plastic sheet as it passes, upon said roll, to the backing material, the incision being oblique with relation to the thickness of the sheet, of sinuous form, progressing lengthwise of the work, and its loops being of an amplitude substantially equal to the width of the strip of backing material.

10. The method of applying a coating of plastic material to a strip of backing material which comprises calendering said plastic material onto said backing material and venting gas from between the sheeted plastic material and the roll on which it is carried by holding a knife, in cutting relation to the plastic sheet, against said roll, and so moving said knife along the roll, as the latter rotates, as to cut in the plastic sheet a slit progressing longitudinally of the sheet.

11. The method of applying a coating of plastic material to a strip of backing material which comprises calendering said plastic material onto said backing material and venting gas from between the sheeted plastic material and the roll on which it is carried by so holding a knife, in cutting relation to the plastic sheet, against said roll, and so moving said knife along the roll, as the latter rotates, as to cut in the plastic sheet a bevel slit progressing longitudinally of the sheet.

12. Apparatus for applying a sheet of plastic material to backing material, said apparatus comprising means for progressively joining the two by rolling pressure and means for effecting periodic incision of said sheet in advance of its application to said backing material.

13. Apparatus for manipulating plastic material, said apparatus comprising a sheet forming member, means for progressively sheeting said material against said member by rolling pressure, means at another point for applying rolling pressure to the sheeted stock on said member, and incising means positioned operatively between the two aforesaid means and adapted for periodic incision of the sheeted stock on said member at substantially all positions throughout the width of the sheet to vent gas from between the latter and the sheeted stock thereon.

14. Apparatus for applying a sheet of plastic material to backing material said apparatus comprising means for progressively joining the two by rolling pressure and means for effecting periodic incision of said sheet in advance of its application to said backing material, said means being adapted to incise the material obliquely with relation to the thickness of the sheet.

15. Apparatus for applying a continuous sheet of plastic material to backing material, said apparatus comprising a presser member, means for supporting said sheet and progressively pressing it onto said backing material against said presser member, a knife, and means for causing such relative movement between said knife and said sheet as to cut a sinuous, longitudinally progressing slit in said sheet in advance of its application to said backing material.

16. Apparatus for applying a continuous sheet of plastic material to backing material, said apparatus comprising a presser member, means for supporting said sheet and progressively pressing it onto said backing material against said presser member, a knife, and means for causing such relative movement between said knife and said sheet as to cut a sinuous, longitudinally-progressing slit in said sheet in advance of its application to said backing material, the last said means being adapted to hold said knife with its cutting edge in such position with relation to the sheet as to produce a bevel cut in said sheet.

17. Apparatus for applying a coating of plastic material to a strip of backing material, said apparatus comprising a pair of work-manipulating rolls, means for driving the same, means for guiding a strip of backing material between said rolls, a carriage-mounting disposed along one of said rolls, a carriage mounted thereon for movement along said roll, means on said carriage for incising a sheet of plastic material on said roll, and means for reciprocating said carriage along said roll.

18. Apparatus for applying a coating of plastic material to a strip of backing material, said apparatus comprising a pair of work-manipulating rolls, means for driving the same, means for guiding a strip of backing material between said rolls, a knife, and means for holding said knife in contact with said roll and effecting such movement of said knife as the roll is driven as to cut a sinuous slit in a sheet of said material carried by said roll.

19. Apparatus for applying a coating of plastic material to a strip of backing material, said apparatus comprising a pair of work-manipulating rolls, means for driving the same, means for guiding a strip of backing material between said rolls, a knife, and means for holding said knife in contact with one of said rolls and effecting such movement of said knife as the roll is driven as to cut a sinuous slit in a sheet of said material carried by said roll, the last said means being adapted to hold said knife at such angle as to produce a bevel cut.

20. Apparatus for applying plastic material to a strip of backing material, said apparatus comprising a pair of calender rolls, means for driving the same, means for guiding a strip of backing material between said rolls, a carriage-mounting adjacent one of said rolls, a carriage mounted thereon for movement along said roll, means for so moving said carriage, a pivoted, incising-tool support on said carriage, and an incising tool on said support, said pivoted support being adapted to oscillate with relation to said carriage as the latter moves back and forth along said roll, to maintain said incising tool aligned with the direction of movement of the work with relation to the carriage.

21. Apparatus for applying a sheet of plastic material to a strip of backing material, said apparatus comprising a pair of calender rolls, means for driving the same, means for guiding a strip of backing material between said rolls, an incising tool adapted to operate upon said sheet as it is carried on one of said rolls, a pivotal mounting for said tool adapted to permit said tool automatically to align itself with the direction of relative movement of the work, and means for effecting movement of said tool back and forth along said roll.

22. In combination with a coating calender, a tool holder mounting adjacent one of the calender rolls, a tool holder pivoted on said mounting, on an axis substantially radial with relation to said roll, and extending transversely from its pivotal axis, an incising tool mounted on said holder and adapted to act against said roll and to align itself with the relative movement of the work, and means for moving said tool-holder mounting along said roll.

23. In combination with a coating calender having cooperating rolls, a shaft mounted adjacent and parallel to said rolls, said shaft being formed with a return screw, a cutting device mounted on said shaft and engaged by said screw, said cutting device also engaging one of said rolls, and means for rotating said shaft to reciprocate said cutting device, said return screw being adapted to move said cutting device back and forth substantially throughout the width of the work in said calender rolls in a manner such as to provide a periodic venting of gas from between the adjacent roll and the work substantially throughout the width of the latter.

24. In combination with a coating calender having cooperating rolls, an incising tool mounted adjacent one of said rolls and adapted to incise the coating material thereon, and means for reciprocating said incising tool, said means being adapted to be operated by the travel of the material to be coated.

25. In combination with a coating calender having cooperating rolls, a carriage mounted adjacent one of said rolls, for movement lengthwise thereof, means for reciprocating said carriage, a flexible knife mounted on said carriage and engaging one of said rolls to incise the material thereon, and yielding means on said carriage for urging said knife toward said roll, said knife being adapted to be flexed by its pressure against the work and against said roll.

In witness whereof I have hereunto set my hand this 23rd day of January, 1924.

JOHN E. NOONAN.